United States Patent
Lin et al.

(10) Patent No.: US 9,516,290 B2
(45) Date of Patent: Dec. 6, 2016

(54) WHITE BALANCE METHOD IN MULTI-EXPOSURE IMAGING SYSTEM

(71) Applicant: Quanta Computer Inc., Kuei Shan Hsiang, Tao Yuan Shien (TW)

(72) Inventors: Keng-Sheng Lin, Tao Yuan Shien (TW); Chung-Te Li, Tao Yuan Shien (TW); Cheng-Ya Sha, Tao Yuan Shien (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 0 days.

(21) Appl. No.: 14/547,395

(22) Filed: Nov. 19, 2014

(65) Prior Publication Data
US 2016/0105656 A1  Apr. 14, 2016

(30) Foreign Application Priority Data
Oct. 13, 2014  (TW) .............................. 103135323 A

(51) Int. Cl.
*H04N 5/235* (2006.01)
*H04N 5/232* (2006.01)
*H04N 5/355* (2011.01)
*H04N 9/73* (2006.01)

(52) U.S. Cl.
CPC ............ *H04N 9/735* (2013.01); *H04N 5/2351* (2013.01); *H04N 5/2355* (2013.01); *H04N 5/23229* (2013.01); *H04N 5/35554* (2013.01)

(58) Field of Classification Search
CPC ........... H04N 5/23229; H04N 5/2351; H04N 5/2353; H04N 5/2355; H04N 5/35536; H04N 5/35545; H04N 5/35554; H04N 5/35581; H04N 9/73; H04N 9/735
See application file for complete search history.

(56) References Cited

U.S. PATENT DOCUMENTS

| 2011/0317028 A1* | 12/2011 | Shinmei ............... | H04N 5/2355 348/223.1 |
| 2012/0262600 A1* | 10/2012 | Velarde ................ | H04N 5/2355 348/223.1 |

FOREIGN PATENT DOCUMENTS

JP  2012049600 A  *  3/2012

OTHER PUBLICATIONS

Machine Translation of JP2012-049600A to Kurane et al (published Mar. 8, 2012), generated on Jan. 8, 2016.*

* cited by examiner

*Primary Examiner* — Daniel M Pasiewicz
(74) *Attorney, Agent, or Firm* — McClure, Qualey & Rodack, LLP

(57) ABSTRACT

A white-balance method for use in a multi-exposure imaging system having an image capturing unit is provided. The method includes the steps of: utilizing the image capturing unit to simultaneously capture a first image and a second image of a scene with a first exposure value and a second exposure value, respectively, wherein the second exposure value is smaller than the first exposure value, and the first exposure value and the second exposure value have individual exposure time and exposure gain; performing light source detection on the second image to obtain light source information and a corresponding light source color ratio of the scene; and performing a color gain process on the first image according to the light source color ratio to generate an output image.

8 Claims, 5 Drawing Sheets

WHITE BALANCE METHOD IN MULTI-EXPOSURE IMAGING SYSTEM

CROSS REFERENCE TO RELATED APPLICATIONS

This Application claims priority of Taiwan Patent Application No. 103135323, filed on Oct. 13, 2014, the entirety of which is incorporated by reference herein.

BACKGROUND OF THE INVENTION

Field of the Invention

The present invention relates to image processing, and, in particular, to a multi-exposure imaging system and white-balance method thereof.

Description of the Related Art

Colors are crucial elements of an imaging system that allows the user to capture the true color of objects in a scene, and also to enhance the accuracy of other advanced functions such as object detection and recognition. However, the color of the captured pixels is usually affected by the various ambient light sources. For example, a white paper may be visually light blue under a light source having a high color temperature, and the same white paper may be visually light yellow under a light source having a low color temperature. A good image system should extinguish the effect of light sources, thereby recovering the true color of objects which is performed by an auto white-balance process. In other words, an auto white-balance process may recognize ambient light sources and cancel the effect of the light sources toward colors, thereby recovering the true colors of objects.

A common image system can only take a single image. However, there is very limited information in a single image, resulting in ineffectiveness to recognize ambient light sources by current auto white-balance techniques. Accordingly, the aforementioned problem can be solved by using multiple images. For example, the first method is for multiple images to be captured at various angles in the same scene to recognize the true colors of objects. The second method is for different ambient light sources to be used in the same scene to recognize the true colors of objects. However, it is difficult to implement the first and second methods in practical conditions because the camera should be moved several times in the first method, and extra light sources are required in the second method. In addition, the exposure value may also heavily affect the result of recognizing ambient light sources. Accordingly, the user has to manually perform a complicated calibration to obtain the best white-balance effect.

Recently, manufacturers, researchers and users have paid more attention to high dynamic range imaging systems. The principle for generating a high dynamic range image is to combine images having different exposure time. The images having different exposure time may provide the imaging system with more information about the details of the scene, and assist the auto white-balance process to achieve a better result. For example, the dark region of a long-exposure image and the bright region of a short-exposure image can be utilized in the auto white-balance process. However, the aforementioned method cannot recognize ambient light sources. In addition, the locations of the bright region and the dark region should be accurately determined in the aforementioned method, but this step may cause non-consecutive blocks in the output image, resulting in lower image quality. Accordingly, the conventional auto-white balance process should be improved upon.

BRIEF SUMMARY OF THE INVENTION

A detailed description is given in the following embodiments with reference to the accompanying drawings.

In an exemplary embodiment, a white-balance method for use in a multi-exposure imaging system having an image capturing unit is provided. The method includes the steps of: utilizing the image capturing unit to simultaneously capture a first image and a second image of a scene with a first exposure value and a second exposure value, respectively, wherein the second exposure value is smaller than the first exposure value, and the first exposure value and the second exposure value have individual exposure time and exposure gain; performing light source detection on the second image to obtain light source information and a corresponding light source color ratio of the scene; and performing a color gain process on the first image according to the light source color ratio to generate an output image.

In another exemplary embodiment, a multi-exposure imaging system is provided. The multi-exposure imaging system comprises: an image capturing unit and a processor. The image capturing unit is configured to simultaneously capture a first image and a second image of a scene with a first exposure value and a second exposure value, respectively. The second exposure value is smaller than the first exposure value, and the first exposure value and the second exposure value comprise individual exposure time and exposure gain. The processor is configured to perform light source detection on the second image to obtain light source information and a corresponding light source color ratio of the scene, and perform a color gain process on the first image according to the light source color ratio to generate an output image.

In yet another exemplary embodiment, a white-balance method for use in a multi-exposure imaging system having an image capturing unit is provided. The method includes the steps of: utilizing the image capturing unit to simultaneously capture a first image and a second image of a scene with a first exposure value and a second exposure value, respectively, wherein the second exposure value is smaller than the first exposure value, and the first exposure value and the second exposure value comprise individual exposure time and exposure gain; performing light source detection on the second image to obtain light source information and a corresponding light source color ratio of the scene; performing an image combination process on the first image and the second image to obtain a third image; and performing a color gain process on the third image according to the light source color ratio to generate an output image

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
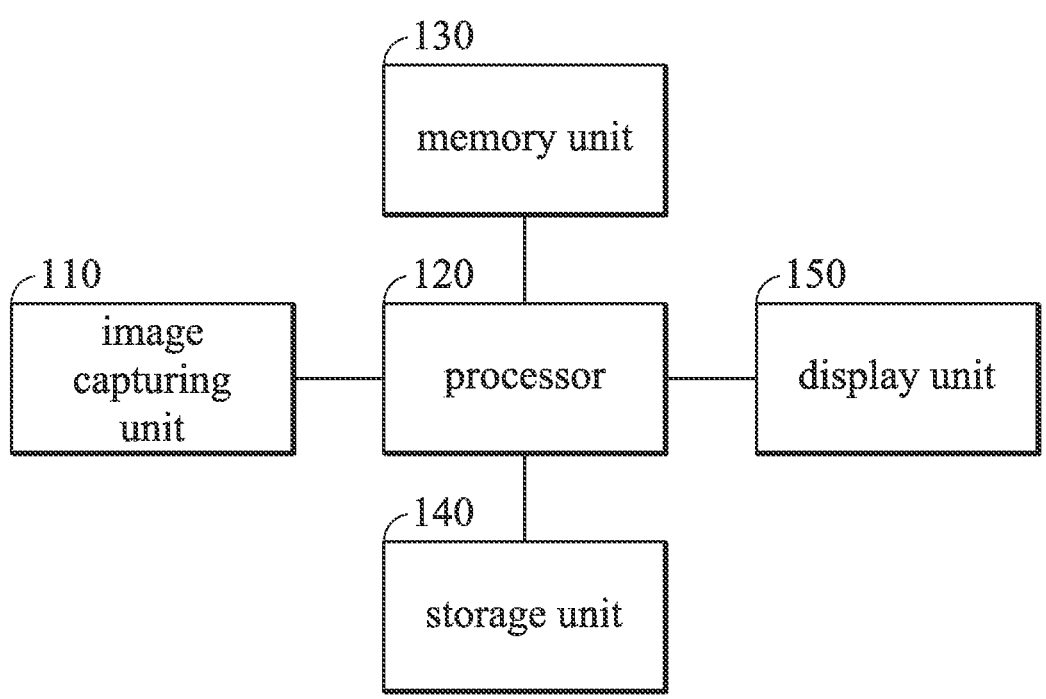
FIG. 1 is a block diagram of a multi-exposure imaging system 100 in accordance with an embodiment of the invention.

FIG. 1 is a block diagram of a multi-exposure imaging system 100 in accordance with an embodiment of the invention. As shown in FIG. 1, the multi-exposure imaging system comprises an image capturing unit 110, a processor 120, a memory unit 130, a storage unit 140, and a display unit 150. The image capturing unit 110 is configured to capture images of a scene. The storage unit 140 is configured to store program codes of various modules for image processing, such as a tone-mapping module, an auto white-balance module, a saturation compensation module, a high dynamic range imaging module, etc. For example, the memory unit 130 is a volatile memory such as a dynamic random access memory (DRAM). The storage unit 140 is a non-volatile memory such as a hard disk, flash memory, etc. The processor 120 loads the program codes of each image processing module stored in the storage unit 140 into the memory unit 130, and performs corresponding image processing on an image. The image capturing unit 110 has multi-exposure functionality which indicates that different exposure values can be applied to the images captured by the image sensors of the image capturing unit 110, thereby generating two images having different exposure values. The aforementioned exposure values comprise the exposure time and exposure gain, and the exposure value is affected by both the exposure time and exposure gain. For example, the exposure value may increase based on increment of the exposure time or exposure gain. The exposure value may affect the pixel values of the same object detected by the image sensors. For example, the exposure of the captured images can be normal exposure and short exposure, or long exposure and short exposure. In an embodiment, the normal exposure indicates that the captured image includes the most valid information, such as calibrating the exposure value so that the average brightness value of the image is of a specific ratio of the maximum sensing value of the image sensors. The short exposure indicates that pixels in the captured images are not over-exposed. For example, the exposure value is calibrated so that the pixels in the image are smaller than or equal to the maximum sensing value of the image sensors.

Figure 2:
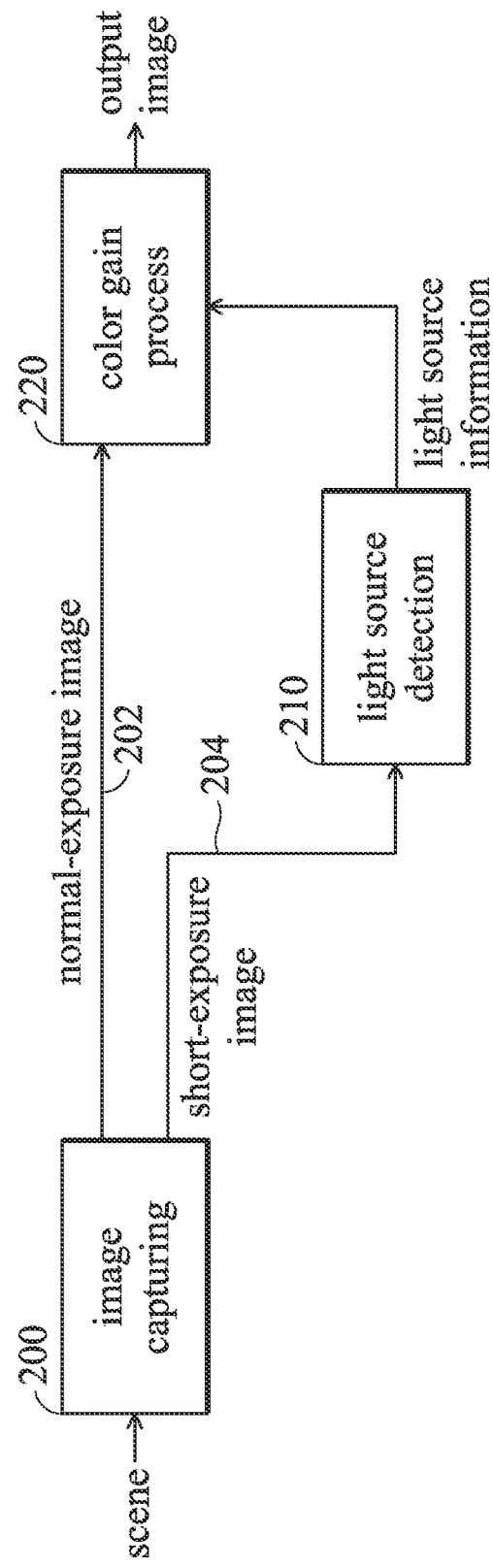
FIG. 2 is a flow chart of a white-balance method in accordance with an embodiment of the invention.

FIG. 2 is a flow chart of a white-balance method in accordance with an embodiment of the invention. As shown in FIG. 2, in block 200, two images having different exposure values are obtained by the image sensors. For example, the normal-exposure image is at path 202, and the short-exposure image is at path 204. Specifically, the exposure value of the normal-exposure image is of a specific ratio (e.g. 18%) of the maximum sensing value of the image sensors, but the invention is not limited thereto. The pixel values in the short-exposure image are smaller than or equal to the maximum sensing value of the image sensors.

In block 210, light source detection is performed on the short-exposure image. Since the exposure value of the short-exposure image is smaller, the portion of light source in the scene will not be over-exposed, so that the light source (i.e. the brightest region in the scene) in the scene can be effectively determined. In an embodiment, the processor 120 calculates the top 5% brightest pixel values as a light source, and calculates the color ratios of the light source, such as calculating the average values of the red, green, and blue colors.

In block 220, the color gain of the normal-exposure image is calibrated according to the color ratio of the light source obtained from light source detection. For example, when the color ratio R: G: B of the light source is a:b:c in block 210, the processor 120 may calibrate the pixels values of the normal-exposure image using the following formulas:

$$R' = p \times R + (1-p) \times \frac{b}{a} R \quad (1)$$

$$G' = p \times G + (1-p) \times \frac{b}{b} G \quad (2)$$

$$B' = p \times B + (1-p) \times \frac{b}{c} B \quad (3)$$

$$p \in [0, 1]$$

wherein R, G, B denote red, green and blue pixel values before calibration; R', G' and B' denote red, green, and blue pixel values after calibration; p denotes a weighting factor.

Figure 3:
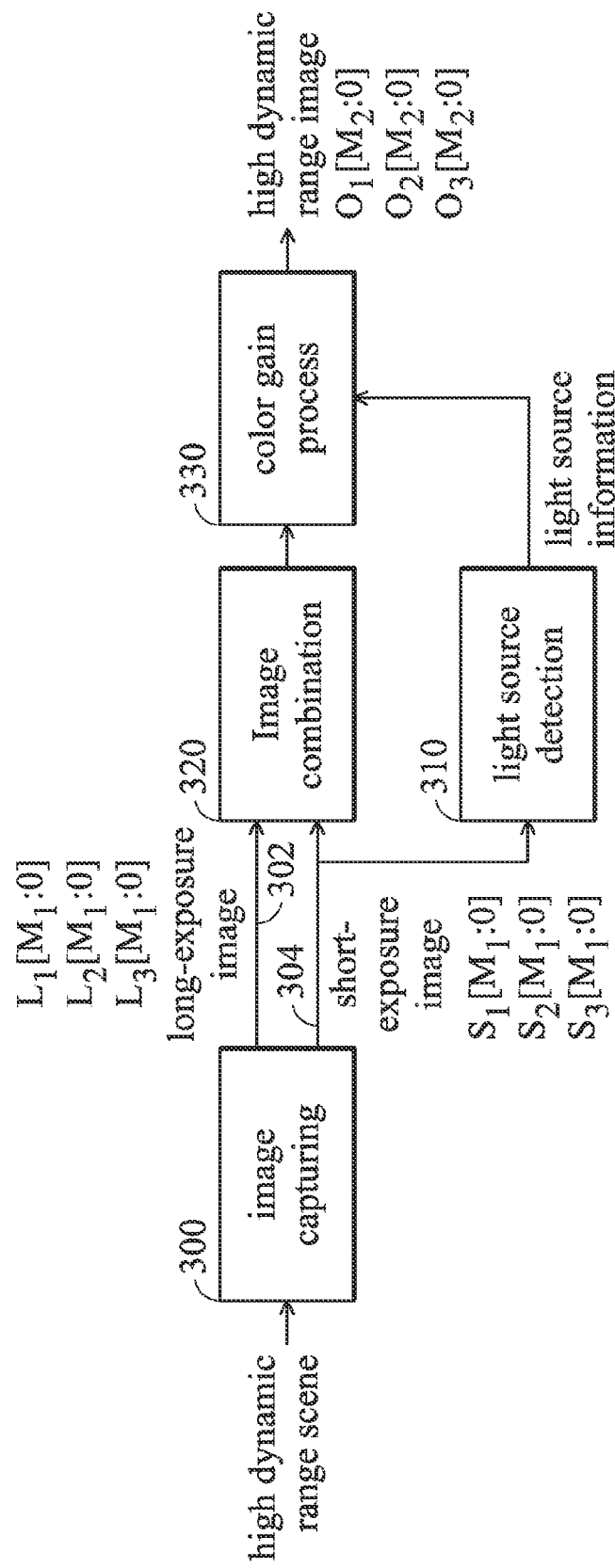
FIG. 3 is a flow chart of a white-balance method in accordance with another embodiment of the invention.

FIG. 3 is a flow chart of a white-balance method in accordance with another embodiment of the invention. In an embodiment, it should be noted that the short-exposure image can be used to calculate light source information, and the image details in the short-exposure image can be used to combine images having different exposure values to generate a high dynamic range image. As shown in FIG. 3, in block 300, two images having different exposure values in a high dynamic range scene are captured by the image sensors. For example, the long-exposure image L is at path 302, and the short-exposure image S is at path 304. For example, the exposure value of the short-exposure image is calibrated, so that the pixels in the image are not over-exposed. In an embodiment, the exposure value can be calibrated, so that the pixel values of the image is larger than the noise value of the image sensors. In another embodiment, the exposure value can be calibrated, so that the pixel values of the image are smaller than or equal to the maximum sensing value of the image sensors. In addition, the long-exposure image has $L_1$, $L_2$, and $L_3$ color channels having $(M_1+1)$ bits. The short-exposure image has $S_1$, $S_2$, and $S_3$ color channels having $(M_1+1)$ bits.

In block 310, light source detection is performed on the short-exposure image. Since the exposure value of the short-exposure image is smaller, the light source portion in the scene will not be over-exposed, so that the light source (i.e. the brightest region in the scene) in the scene can be effectively determined. In an embodiment, the processor 120 calculates top 5% brightest pixel values as a light source, and calculates color ratios of the light source, such as calculating the average values of red, green, and blue colors, respectively.

In block 320, an image combination process is performed on the short-exposure image and the long-exposure image to obtain a combined image. For example, the ratio K of the long exposure value and short exposure value can be used during the procedure of the image combination process, and the pixel values of the short-exposure image is multiplied by K, thereby obtaining the pixel information which is lacking due to over-exposure in the long-exposure image. In an embodiment, two images having different exposure values are used in the image combination process to obtain a high dynamic range image. For the ambient light sources having the same brightness, different pixel values will be obtained due to different exposure time. For example, x denotes the number of bits of the image sensors, and R denotes the ratio of two exposure times. Under the light sources having the same brightness, there is a difference of R multiples between the pixel values in the images having different exposure times. Accordingly, the images having two different exposure values can be combined after normalizing the pixel values of the short-exposure image by multiplying R. In other words, if the ratio of dynamic ranges of the image sensors is D, a high dynamic range image having a dynamic range ratio of R×D can be obtained by the multi-exposure imaging system 100.

In block 330, the color gain of the short-exposure image is calibrated according to the color ratio of the light source obtained from light source detection in block 310, thereby generating a high dynamic range image O which has $O_1$, $O_2$, and $O_3$ color channels having $(M_2+1)$ bits, wherein $M_2$ is larger than $M_1$. Specifically, when the color ratio R:G:B of the light source is a:b:c in block 310, the processor 120 may calibrate the pixel values of the normal-exposure image using the following formulas:

$$R' = p \times R + (1-p) \times \frac{b}{a} R \qquad (1)$$

$$G' = p \times G + (1-p) \times \frac{b}{b} G \qquad (2)$$

$$B' = p \times B + (1-p) \times \frac{b}{c} B \qquad (3)$$

$$p \in [0, 1]$$

wherein R, G, B denote red, green and blue pixel values before calibration; R', G' and B' denote red, green, and blue pixel values after calibration; p denotes a weighting factor.

Figure 4A:
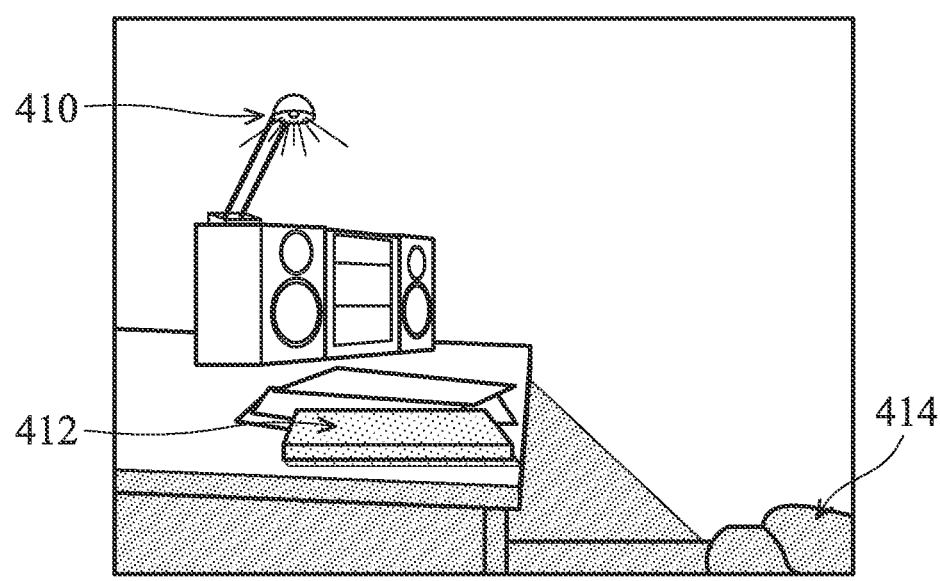
FIG. 4A is a diagram illustrating a scene 400 in accordance with an embodiment of the invention.
Figure 4B:
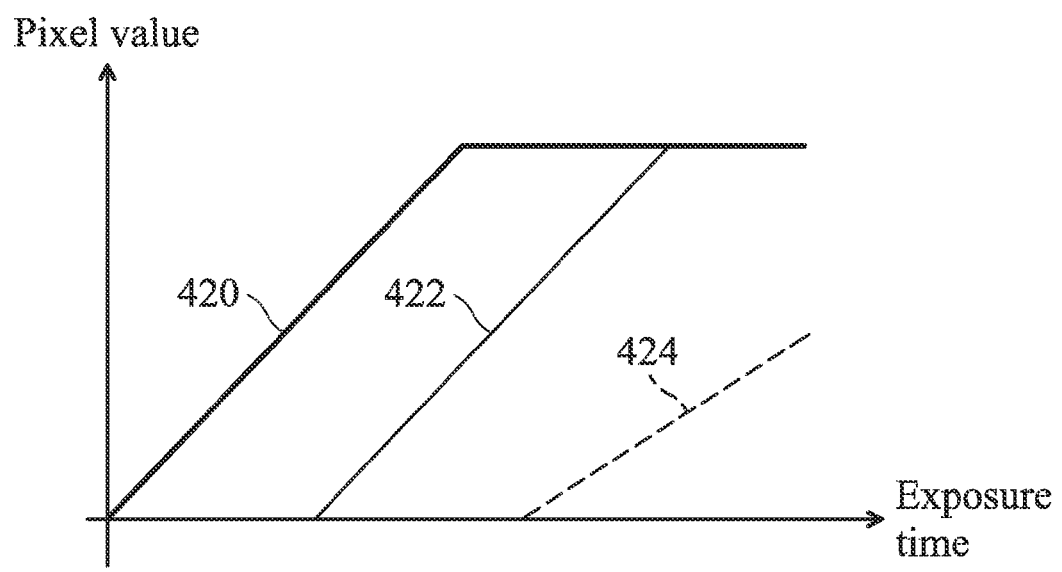
FIG. 4B is a diagram illustrating exposure at different position in the scene 400 in accordance with an embodiment of the invention.

FIG. 4A is a diagram illustrating a scene 400 in accordance with an embodiment of the invention. FIG. 4B is a diagram illustrating exposure at different positions in the scene 400 in accordance with an embodiment of the invention. As shown in FIG. 4A, there is a light source at position 410 in the scene 400. When the processor 120 is determining the light source information, the pixel values of the pixels relative to the exposure time at different positions (e.g. positions 410, 412, and 414) in the scene 400 can be utilized by the processor 120 to determine the position of the light source in the scene 400. For example, the curves 420, 422 and 424 denote the relationship of pixel values over exposure time at positions 410, 412, and 414, respectively. As shown in FIG. 4B, the pixel value at position 410 is saturated after a very short exposure time. However, the pixel values at position 412 and 414 may be saturated after a longer exposure time relative to that in position 410. Accordingly, the processor 120 may utilize the relationship of each curve in FIG. 4B to determine that the light source of the scene 400 is located at position 410.

The methods, or certain aspects or portions thereof, may take the form of a program code embodied in tangible media, such as floppy diskettes, CD-ROMs, hard drives, or any other machine-readable (e.g., computer-readable) storage medium, or computer program products without limitation in external shape or form thereof, wherein, when the program code is loaded into and executed by a machine such as a computer, the machine thereby becomes an apparatus for practicing the methods. The methods may also be embodied in the form of a program code transmitted over some transmission medium, such as an electrical wire or a cable, or through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A white-balance method for use in a multi-exposure imaging system having an image capturing unit, the method comprising:

utilizing the image capturing unit to simultaneously capture a first image and a second image of a scene with a first exposure value and a second exposure value, respectively, wherein the second exposure value is lower than the first exposure value, and the first exposure value and the second exposure value comprise individual exposure time and exposure gain;

calibrating the second exposure value, so that an average brightness value of pixels in the second image is equal to a specific ratio of a maximum sensing value of the image capturing unit;

performing light source detection on the second image to obtain light source information and a light source color ratio corresponding to the light source information, wherein the light source color ratio of red, green, and blue colors is a:b:c; and performing a color gain process on the first image according to the light source color ratio to generate an output image, wherein red, green, and blue colors of each pixel in the output image in the color gain process are respectively defined by the following formulas:

$$R' = p \times R + (1-p) \times \frac{b}{a} R;$$

$$G' = p \times G + (1-p) \times \frac{b}{b} G;$$

$$B' = p \times B + (1-p) \times \frac{b}{c} B;$$

where R, G, and B denote pixel values of red, green, and blue colors in the first image; R', G' and B' denote pixel values of red, green, and blue colors in the output image; and p denotes a weighting factor between 0 and 1.

2. The method as claimed in claim 1, further comprising:
determining pixels having a specific ratio of brightest pixels in the second image as the light source information.

3. A multi-exposure imaging system, comprising:
an image capturing unit, comprising a plurality of image sensors for simultaneously capturing a first image and a second image of a scene with a first exposure value and a second exposure value, respectively, wherein the second exposure value is smaller than the first exposure value, and the first exposure value and the second exposure value comprise individual exposure time and exposure gain; and
a processor, for performing light source detection on the second image to obtain light source information and a light source color ratio corresponding to the light source information, and performing a color gain process on the first image according to the light source color ratio to generate an output image, wherein the light source color ratio of red, green, and blue colors is a:b:c,
wherein the processor further calibrates the second exposure value, so that an average brightness value of pixels in the second image is equal to a specific ratio of a maximum sensing value of the image capturing unit,
wherein red, green, and blue colors of each pixel in the output image in the color gain process are respectively defined by the following formulas:

$$R' = p \times R + (1-p) \times \frac{b}{a} R;$$

$$G' = p \times G + (1-p) \times \frac{b}{b} G;$$

$$B' = p \times B + (1-p) \times \frac{b}{c} B;$$

where R, G, and B denote pixel values of red, green, and blue colors in the first image; R', G' and B' denote pixel values of red, green, and blue colors in the output image; and p denotes a weighting factor between 0 and 1.

4. The multi-exposure imaging system as claimed in claim 3, wherein the processor further determines pixels having a specific ratio of brightest pixels in the second image as the light source information.

5. A white-balance method for use in a multi-exposure imaging system having an image capturing unit, the method comprising:
utilizing the image capturing unit to simultaneously capture a first image and a second image of a scene with a first exposure value and a second exposure value, respectively, wherein the second exposure value is lower than the first exposure value, and the first exposure value and the second exposure value comprise individual exposure time and exposure gain;
calibrating the second exposure value, so that an average brightness value of pixels in the second image is equal to a specific ratio of a maximum sensing value of the image capturing unit;
performing light source detection on the second image to obtain light source information and a light source color ratio corresponding to the light source information, wherein the light source color ratio of red, green, and blue colors is a:b:c;
performing an image combination process on the first image and the second image to obtain a third image; and
performing a color gain process on the third image according to the light source color ratio to generate an output image,
wherein red, green, and blue colors of each pixel in the output image in the color gain process are respectively defined by the following formulas:

$$R' = p \times R + (1-p) \times \frac{b}{a} R;$$

$$G' = p \times G + (1-p) \times \frac{b}{b} G;$$

$$B' = p \times B + (1-p) \times \frac{b}{c} B;$$

where R, G, and B denote pixel values of red, green, and blue colors in the third image; R', G' and B' denote pixel values of red, green, and blue colors in the output image; and p denotes a weighting factor between 0 and 1.

6. The method as claimed in claim 5, further comprising:
calibrating the second exposure value, so that pixel values of the second image are larger than a noise value of the image capturing unit.

7. The method as claimed in claim 5, further comprising:
calibrating the second exposure value, so that pixel values of the second image are smaller than or equal to a maximum sensing value of the image capturing unit.

8. The method as claimed in claim 5, further comprising:
calculating a ratio of the first exposure value and the second exposure value; and
multiplying pixels values of the second image by the ratio to obtain the third image.

* * * * *